United States Patent [19]

Blanding

[11] Patent Number: 5,060,211
[45] Date of Patent: Oct. 22, 1991

[54] TRANSPORT DRIVE AND SUPPORT MEANS FOR AN AUTOMATED DATA LIBRARY

[75] Inventor: Douglass L. Blanding, Rochester, N.Y.

[73] Assignee: Eastman Kodak Company, Rochester, N.Y.

[21] Appl. No.: 508,035

[22] Filed: Apr. 10, 1990

[51] Int. Cl.$^5$ .................... G11B 17/10; G11B 17/22
[52] U.S. Cl. ........................................ 369/36; 369/34
[58] Field of Search .................. 369/36, 39, 75.1, 251, 369/191, 194, 34, 35

[56] References Cited

U.S. PATENT DOCUMENTS

| | | | |
|---|---|---|---|
| 4,064,544 | 12/1977 | Stratton | 360/107 |
| 4,286,790 | 9/1981 | Siryj . | |
| 4,502,133 | 2/1985 | Siryj . | |
| 4,504,936 | 3/1985 | Faber . | |
| 4,561,078 | 12/1985 | Nakayama | 369/36 |
| 4,608,679 | 8/1986 | Rudy . | |
| 4,614,474 | 9/1986 | Sudo . | |
| 4,787,074 | 11/1988 | Deck . | |
| 4,815,055 | 3/1989 | Fago | 369/36 |
| 4,817,071 | 3/1989 | Carison . | |
| 4,912,575 | 3/1990 | Shiosaki | 369/34 |

Primary Examiner—David Trafton
Assistant Examiner—John Pokotylo
Attorney, Agent, or Firm—Robert L. Randall

[57] ABSTRACT

An automated disk library which provides the necessary rigidity and accuracy of positioning of the transport mechanism with respect to the storage bays and the disk drives without the attendant cost, bulk and weight of the prior art devices. The transport drive and support comprises a carriage member disposed in the shaftway with structure for locating the carriage with respect to an x-axis and a y-axis transverse of the shaftway while permitting motion of the carriage along a z-axis parallel to the shaftway. A plurality of guide surfaces are provided on the portion of the housing adjacent the shaftway with guide rollers rotatably mounted on the carriage and bearing on guide surfaces to locate the carriage with respect to the x- and y-axis. The structure for locating the carriage with respect to rotation about the x- and the y-axes comprises pairs of pulleys rotatably mounted at opposite ends of the sides of the carriage cooperating with cables which extend from the top to the bottom of the assembly housing and are wrapped about the pairs of pulleys and tensioned so as to produce a rotating force on the carriage about the x- and the y-axis opposite to the rotating force applied by the carriage drive.

11 Claims, 3 Drawing Sheets

TRANSPORT DRIVE AND SUPPORT MEANS FOR AN AUTOMATED DATA LIBRARY

RELATED APPLICATIONS

The present invention relates to an improved automated data library and is related to the improvements disclosed and claimed in copending applications Ser. No. 508,036, Housing Means for an Automated Data Library, filed in my name, and Ser. No. 507,940, Media Drive for an Automated Data Library, and Ser. No. 508,039, Media Insertion Means for an Automated Data Library, both filed in the names of John J. Ellis and Stephen P. Smith, all filed on even date herewith.

BACKGROUND OF THE INVENTION

Field of the Invention

The present invention is directed to apparatus for the storage and retrieval of data and information. More particularly, it relates to improvements in apparatus for transporting information storage disks, for example, magnetic, optic and magneto-optic storage disks, in a storage and retrieval device commonly referred to as an automated disk library.

Automated disk libraries, also known as "jukeboxes", are known in the art for storing and accessing a large number of data storage disks. Examples of such libraries are those disclosed in U.S. Pat. Nos. 4,286,790, 4,502,133, 4,504,936 4,608,679, 4,614,474, 4,787,074 and 4,817,071. In such libraries, each information storage disk is housed in a protective cartridge or carrier which holds the disk and permits disk handling while permitting accessibility to the disk for data recording and/or retrieval. The disk carriers, with the associated disks, are supported by one or more storage racks which are arranged to support the disk and disk carriers in closely spaced parallel planes, for example, one above the other with the disks being disposed horizontally. Such automated disk libraries commonly include one or more disk drives for recording and/or retrieving information to or from a disk, as well as a disk carrier transport mechanism for transporting a selected carrier and disk between the storage location and the disk drive unit.

A necessary attribute of automated disk libraries is the ability to reliably transfer the disk from the storage rack to the transport means to the disk drive and back again. It is thus necessary that the transport means be repeatably and accurately aligned with the various stations that are addressed so that each disk is accurately aligned with the transport means, the storage station, or the disk drive, respectively, so that the transfer of the disk is repeatably and consistently reliable. To accomplish this repeatably accurate placement of the transport means, the transport means must be accurately located within the assembly and the accurate location must be the same for all positions of the transport means within the assembly. This accurate positioning must be with respect to all the three spatial dimensions, i.e., along the x-axis, the y-axis and the z-axis, as well as with respect to rotation of the transport means about each of the axis, i.e., rotation with respect to the x-axis, $\theta_x$, with respect to rotation about the y-axis, $\theta_y$, and rotation about the z-axis, $\theta_z$.

In order to achieve the accurate and repeatable location of the transport member with respect to the various locations within the assembly, prior art automated disk libraries have been over-designed and overbuilt using expensive high-precision components that are costly in both size, weight and price to achieve the locating accuracy and repeatability necessary. Although the prior art automated disk libraries accomplish the desired result, they are heavy, oversized, and expensive, limiting their usefulness and acceptability. An example of this is seen in the transport mechanism locating means which consists of a pair of long, straight, round steel bars extending the length or height of the library. The transport mechanism is provided with two pairs of linear bushings which ride on the bars. The difficulties with such an arrangement include the necessity of utilizing high-precision bars that have the same diameter along the full length of the assembly. If the bars are not the same diameter throughout their length, the transport mechanism is too loose in some locations and too tight in others, interfering with proper operation and movement of the transport. Moreover, the linear bushings used must be of high precision and thus costly. Additional difficulties are found in the fact that the bushings must be colinear between the two riding the same bar. If they are not colinear, binding will occur, interfering with the operation of the entire automated disk library. In order to achieve colinearity it is necessary to use precision bushings and to accurately align them on the transport mechanism adding to the cost of the overall assembly. A further consideration of the prior art automated disk libraries is the fact that the use of the long steel bars as the guide rails for the transport mechanism in conjunction with the bushings prevents the support of the rails mid-span. Thus, transverse displacement of the rails and the resulting misalignment of the transport mechanism occurs because of the transverse loads applied to or by the transport mechanism as it is moved along the rails. As a result, heavier rods than would otherwise be expected must be used. Again, this adds to the cost and weight of the automated disk library.

It will be seen from the foregoing that automated disk libraries of the prior art are both bulky, heavy, expensive and expensive to operate and maintain. As a result, the information capacity of the library for a given volume of the library is limited by the bulk of the structure, while the market acceptance is limited by this and the cost thereof.

It will thus be seen that the provision of an automated disk library which provides the necessary rigidity and accuracy of positioning of the transport mechanism with respect to the storage bays and the disk drives without the attendant cost, bulk and weight of the prior art devices would be desirable from both cost and space considerations.

SUMMARY OF THE INVENTION

Accordingly, the present invention provides an automated data library comprising a plurality of storage means each arranged to accept and store a data storage member, a reading device arranged to retrieve data from a data storage member, and transport means arranged to selectively transfer data storage members between the storage means and the reading device. A housing for the assembly is formed with a generally centrally disposed shaftway accommodating the movement of the transport means with at least one generally open bay area opening into and extending along the shaftway. The bay area is arranged to locate the plurality of storage means and the reading device therein for access thereto by the transport means. The improvement comprises means for moving and guiding the transport means in the shaftway whereby the transport means is accurately and repeatably located therein with reference to the storage means and the reading device. The transport means comprises a carriage member disposed in the shaftway with means for locating the carriage with respect to an x-axis and a y-axis transverse of the shaftway while permitting motion of the carriage along a z-axis parallel to the shaftway. A plurality of guide surfaces are provided on the portion of said housing adjacent the shaftway with a first guide roller rotatably mounted on the carriage at a first location and bearing on a first guide surface to locate the carriage with respect to the x-axis. A second guide roller is rotatably mounted on the carriage at a second location perpendicular to the first guide roller and bearing on a second guide surface to locate the carriage with respect to the y-axis. A third guide roller is rotatably mounted on the carriage at a third location parallel to one of the first rollers and bearing on a third guide surface to locate the carriage with respect to rotation about the z-axis. A fourth roller is rotatably mounted on the carriage at a location opposite the first three guide rollers with means for biasing the fourth roller into engagement with a fourth guide surface thereby applying a predetermined loading on the three guide rollers. Drive means is provided for moving the carriage along the z-axis.

Further, the present invention provides an automated data library wherein the means for locating the carriage with respect to rotation about the x-axis comprises a pair of pulleys rotatably mounted at opposite ends of a first side of the carriage. Cable means extends from the top of the assembly housing to the bottom of the assembly housing, which is wrapped about the pair of pulleys and tensioned so as to produce a rotating force on the carriage about the x-axis opposite to the rotating force applied by the drive means. The means for locating the carriage with respect to rotation about the y-axis comprises a second pair of pulleys rotatably mounted at opposite ends of a second side of the carriage adjacent the first side, and second cable means extending from the top of the assembly housing to the bottom of the assembly housing. The second cable being wrapped about the second pair of pulleys and being tensioned so as to produce a rotating force on the carriage about the y-axis opposite to the rotating force applied by the drive means.

Various means for practicing the invention and other features and advantages thereof will be apparent from the following detailed description of an illustrative preferred embodiment of the invention, reference being made to the accompanying drawings.

DETAILED DESCRIPTION OF THE PREFERRED EMBODIMENT

Figure 1:
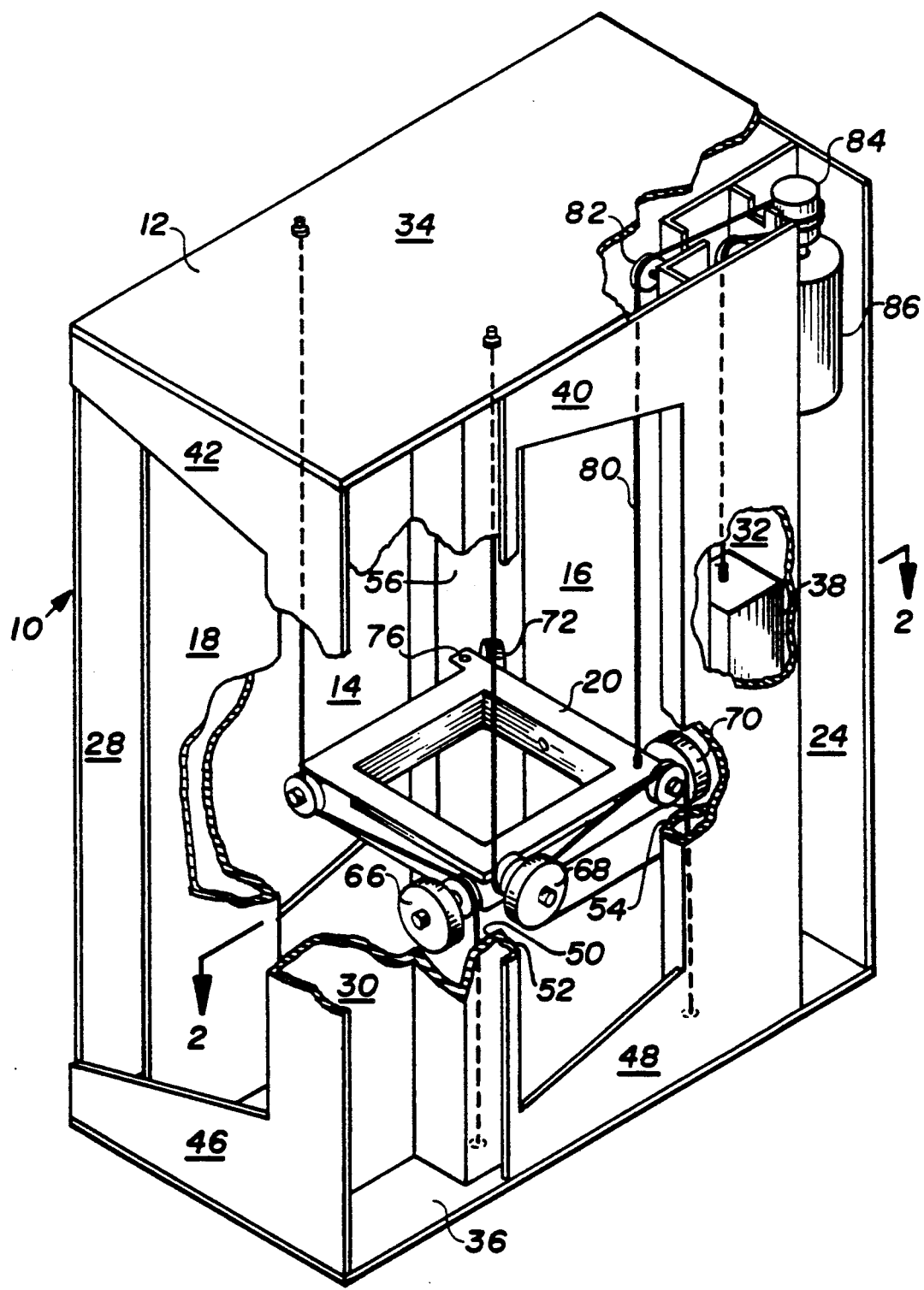
FIG. 1 is a perspective view of a preferred embodiment of the present invention illustrating an automated disk library assembly, with portions thereof cut away.
Figure 2:
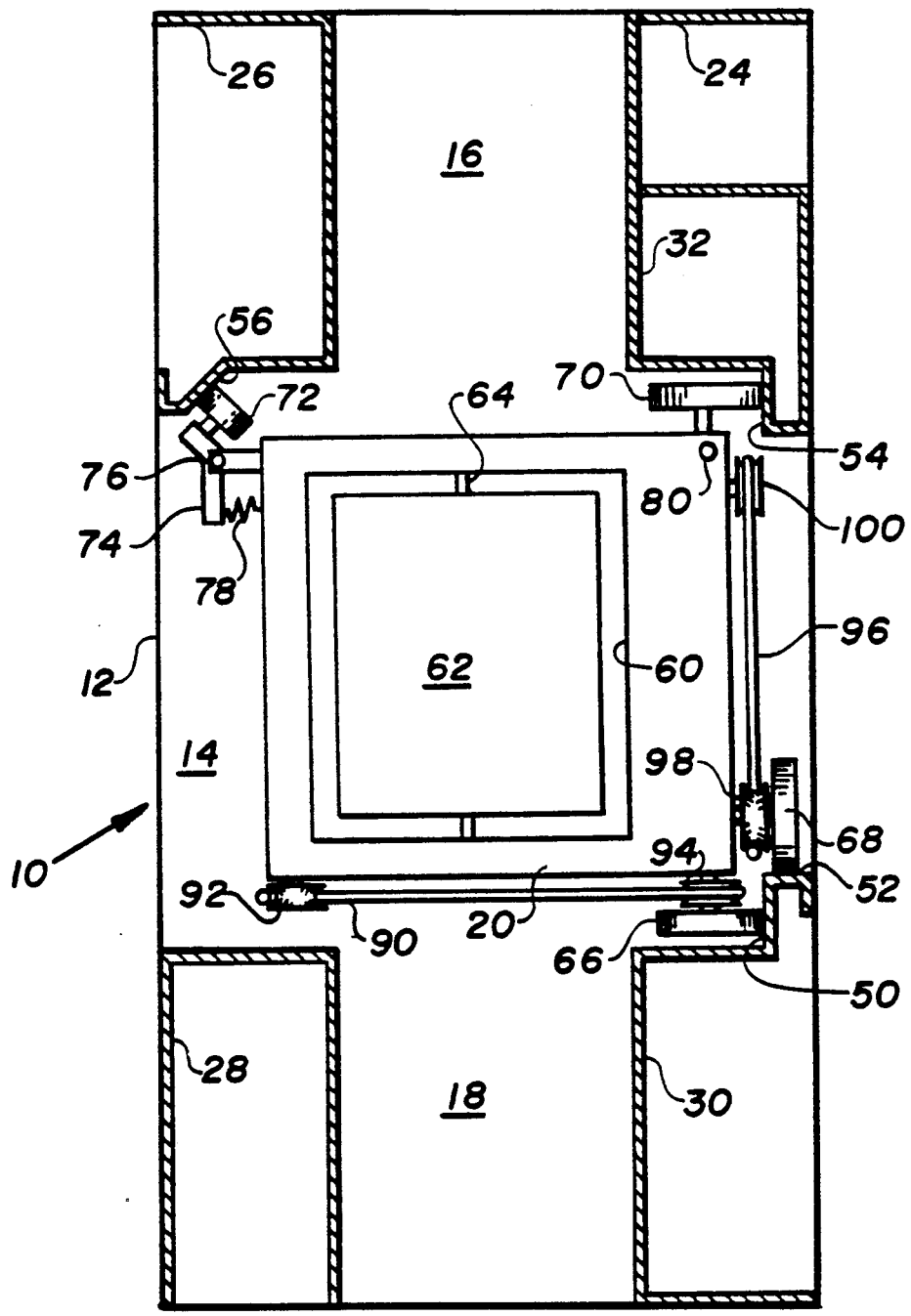
FIG. 2 is a horizontal sectional view taken through the assembly along lines 2—2 of FIG. 1.

Referring now to FIGS. 1 and 2, a preferred embodiment of the transport drive and support means for an automated data library is illustrated. The automated data library 10 comprises a housing 12 consisting of a generally centrally disposed shaftway 14 extending vertically through the center of the housing. A pair of generally open bay areas 16 and 18 are arranged on opposite sides of, and open into the shaftway 14. The bay areas are arranged to locate and support a plurality of storage racks (not shown) which are each arranged to support individual disks and disk carriers in closely spaced vertical stacks arranged with the disks in a horizontal plane. The storage racks are of the type commonly known in the art and are arranged to support the disks and disk carriers so as to be accessible from the shaftway 14. At least one of the bay areas is also arranged to support and locate at least one disk drive arranged to receive a disk and disk carrier delivered from the shaftway, all in a manner generally known to the art. A disk transport means comprising a carriage 20 is disposed in the shaftway for vertical movement therein and for access to each of the disk carriers, with the associated disk, disposed in the storage racks within the bay areas 16 and 18 as well as to the disk drives also located therein.

The assembly housing 12 is constructed of sheet metal which has sufficient stiffness and rigidity to provide the structural integrity to withstand the forces imparted upon the assembly during assembly, shipping and operation. However, it is also constructed to provide the necessary access to the interior thereof for assembly and for service without compromising the structural integrity and rigidity thereof. This is necessary so that the forces imparted to the structure under the foregoing conditions do not deflect or distort the structure in a manner which will compromise or change the positional alignments between the various components therein so that the apparatus can operate as intended, without elaborate repositioning or readjustment necessary. The housing comprises a plurality of longitudinally extending members disposed about and parallel to the shaftway and bay areas. The longitudinally extending members comprise a plurality of channel members 24, 26, 28, and 30 arranged at each of the corners of the housing structure. The channel members are arranged to provide rigidity to the structure as well as mounting space for various other components of the assembly, as will be described hereinbelow. A tubular member 32 is also provided adjacent to one corner of the assembly which, along with channel members 24–30, is structurally connected at the ends thereof to top and bottom housing plate members 34 and 36, respectively. By virtue of the tubular nature of element 32, with the ends structurally closed by the top and bottom plate members 34 and 36, it imparts significant torsional stiffness to the overall housing assembly. This stiffness is enhanced by the relatively large volume occupied by the tubular element 32, and yet the space therein is functionally useful for providing a shaftway for a carriage counterweight 38. A plurality of gusset plates are disposed about and joined to the adjacent edges of the closure plates 34 and 36 to prevent flexural deflection of the closure plates. The gusset plates also enhance the torsional stiffness of the overall housing assembly by connecting the four vertical corner channels so that they combine to effectively form a large tube. At the same time that they provide the requisite stiffness to the housing assembly, the gusset plates do not entirely enclose either the shaftway or the bay areas, so that they are still substantially open to permit assembly and service.

The inner faces of longitudinal channel members 26, 30 and 32, i.e., those facing the shaftway 14, are provided with guide surfaces for the transport means. Channel member 30 is provided with guide surfaces 50 and 52 which are mutually perpendicular and which extend the length of the shaftway. Tubular member 32 is provided with guide surface 54 which is parallel with guide surface 50, and channel member 26 is provided with guide surface 56 which is angled with respect to guide surfaces 50, 52 and 54, in a manner to be more thoroughly described hereinbelow.

The transport carriage 20 is a substantially rectangular member disposed horizontally for vertical movement in shaftway 14. The carriage is provided with a substantially rectangular generally centrally disposed opening 60, within which a rotor 62 is mounted for rotation about a shaft 64, connecting it to the carriage 60. Means (not shown) is provided for rotating the rotor so that either side of a transported disk may be presented to the disk drive, in a manner well known in the art. While not a part of the present invention, the rotor 62 has a width and length substantially equal to that of the disk carrier and is provided with means, also known in the art, to engage a disk carrier located in a storage device in bay 16 or 18, or in a disk drive, and to transport the disk carriage and the disk contained therein onto the rotor for transfer to another location in the assembly. At that point, the rotor is provided with means for discharging the disk carrier to a storage location or to a disk drive, in a manner well known in the art.

Figure 3:
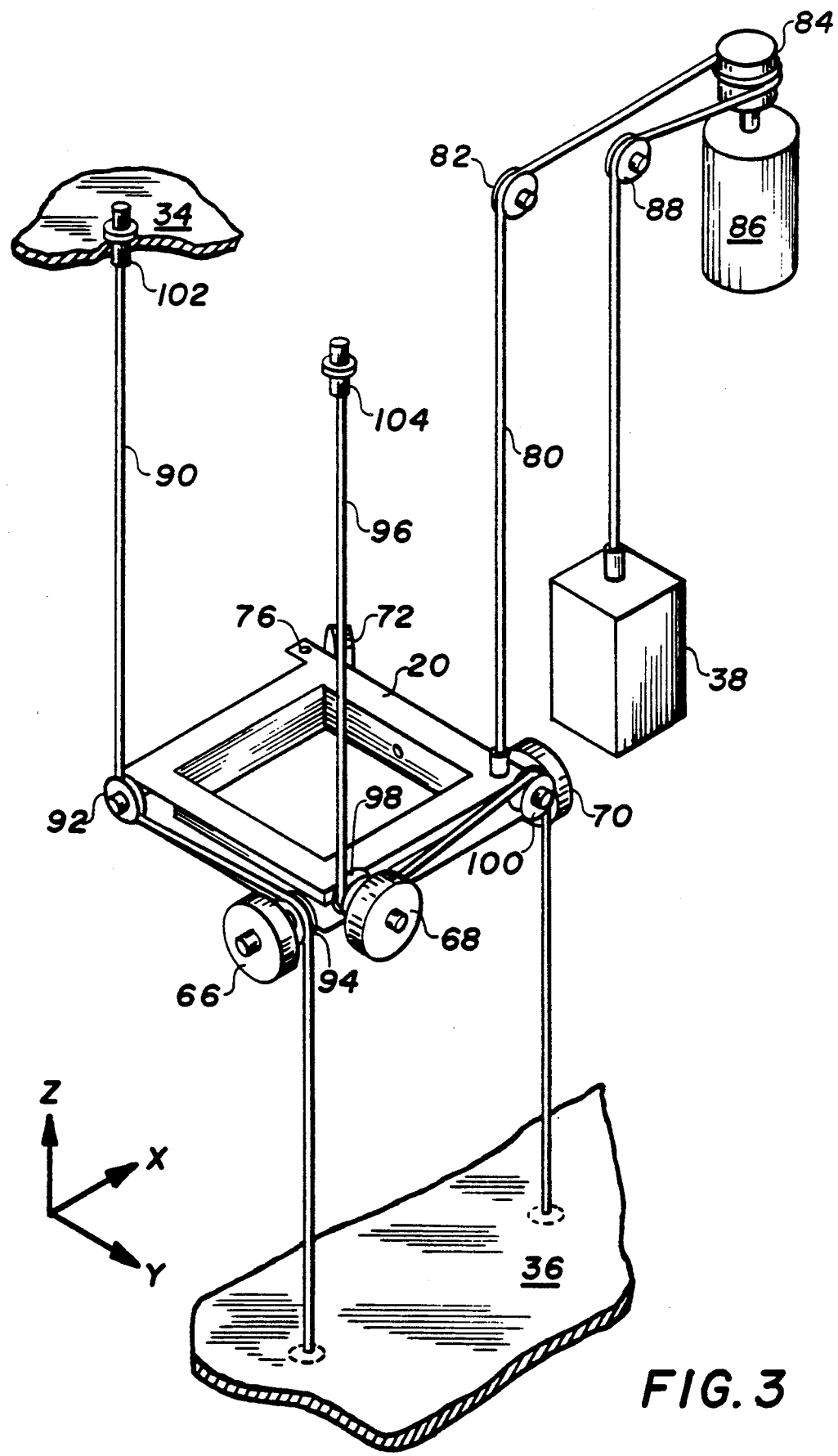
FIG. 3 is schematic perspective view of the transport means with most of the housing of the automated disk library removed.

Referring now to FIGS. 2 and 3, the carriage support and alignment construction is illustrated. The carriage is provided with four rollers rotatably mounted on the carriage. A first roller 66 is mounted on the edge of the carriage 20 adjacent one corner thereof and is arranged to engage guide surface 50 of the housing to locate the carriage in the y-direction. A second guide roller 68 is mounted on a second edge of the carriage adjacent the same corner as the first roller but perpendicular to the first guide roller. The second guide roller 68 bears on guide surface 52 of the housing and locates the carriage with respect to the x-axis. A third guide roller 70 is mounted on a third edge of the carriage opposite to the first guide roller 66 and parallel thereto. The guide roller 70 bears on guide surface 54 of the housing and locates the carriage with respect to rotation about the z-axis, $\theta_z$. A fourth roller 72 is mounted on the opposite corner of the carriage from the first and second guide rollers 66 and 68, on an angled arm 74 which is pivotally mounted to the carriage by pin 76. The end of the arm 74 opposite to that mounting roller 72 is tensioned towards the carriage by a tension spring 78. The tensioning of arm 74 urges the roller 72 into engagement with the guide surface 56 of the housing. The angle of the guide surface 56 is selected so that the force of the roller 72 thereagainst produces a force on the carriage which seats the three guide rollers securely against the respective guide surfaces, thereby accurately and simply locating the carriage with respect to the x-axis, the y-axis, and with respect to rotation about the z-axis. At least one of the guide rollers, 66–70, and optionally all three, are mounted to the carriage via an adjustable eccentric mounting whereby the exact positioning of the carriage with respect to the horizontal location within the shaftway is quickly and easily adjustable.

The carriage is located and moved along the z-axis by a drive cable 80 which is connected to a corner of the carriage adjacent third guide roller 70. The drive cable extends upwardly to the top of the assembly housing where it passes over a guide pulley 82 and then horizontally to wrap several turns about a drive pulley 84 on the upper end of vertically mounted motor 86. After leaving the drive pulley 84, the drive cable passes over a second pulley 88 and down to connect with the counterweight 38. The motor is bi-directional and can be selectively operated to raise or lower the carriage, as desired. It should be noted that the connection point of the cable 80 at the corner of the carriage is not aligned with the center of gravity of the carriage, which is roughly at the center of the carriage, displaced from the connection point of cable 80 along both the x- and y-axes.

The control of the carriage attitude with respect to rotation about the x-axis, $\theta_x$, is provided by a second cable 90 which extends from the top of the housing 34 to the bottom 36. A pair of sheaves, 92 and 94 are provided along the first edge of the carriage, perpendicular to the x-axis, with the sheave 94 being mounted coaxially with guide roller 66. The cable 90 is guided under sheave 92 and over sheave 94 and prevents rotation of the carriage about the x-axis. The cable 90 becomes tensioned naturally in order to counteract the $\theta_x$ torque which is developed due to the y-direction misalignment between the center of gravity of the carriage and the mounting point of cable 80.

Control of the attitude of the carriage with respect to rotation about the y-axis, $\theta_y$, is achieved with a third cable 96 which similarly extends from the top to the bottom of the housing. A second pair of sheaves 98 and 100 are provided along the edge of the carriage perpendicular to the y-axis, with sheave 98 being mounted coaxially with guide roller 68. The third cable member 96 extends under sheave 98 and over sheave 100 to prevent rotation of the carriage about the y-axis. The cable 96 becomes tensioned naturally in order to counteract the $\theta_y$ torque which is developed due to the x-direction misalignment between the center of gravity of the carriage and the mounting point of cable 80. Both cables 90 and 96 are provided with adjustable means 102 and 104, respectively, to adjust the length of the cable and accordingly the orientation of the carriage with respect to rotation about the x- and the y-axes.

It will thus be seen that the present invention provides an automated data library which provides the requisite rigidity and stiffness without excessive bulk or weight and which provides a media transport means which is capable of rapid and easy movement without requiring high precision components which increase both cost and the complexity of the device. Moreover, with the present invention, the useful height of the assembly housing is effectively increased without actually increasing the outside dimensions. This results from the fact that less space is consumed with the structure of the housing which might reduce the data storage space, as well as the fact that the carriage structure is reduced, permitting the carriage to be moved closer to the outer surface of the housing, thus giving access to a larger volume of storage space than permitted by the prior art.

As a result of the simplicity of the housing construction, the quantity of data that may be stored therein is significantly increased for a given volume. For example, an automated data library constructed according to the present invention and having a size approximating that of a standard two-drawer file cabinet, can contain from 40–61, 5.25-inch optical disks and from 1–5 optical disk drives. Such a device would have a capacity of 75 gigabytes, or approximately 10 million pages of written data, in a floor area of under 3 square feet. Moreover, the present arrangement provides simpler manufacturing, improved reliability and lower maintenance requirements, all of which significantly add to the economic advantages of the assembly.

The invention has been described with reference to specific embodiments and variations, but it should be apparent that other modifications and variations can be made within the spirit and scope of the invention, which is defined by the following claims.

What is claimed is:

1. In an automated data library comprising a plurality of storage means each arranged to accept and store a data storage member, a reading device arranged to retrieve data from a data storage member, and transport means arranged to selectively transfer data storage members between said storage means and said reading device, a housing for said assembly forming a generally centrally disposed shaftway accommodating the movement of said transport means and at least one generally open bay area opening into and extending along said shaftway, said bay area being arranged to locate said plurality of storage means and said reading device therein for access thereto by said transport means, the improvement comprising means for moving and guiding said transport means in said shaftway whereby said transport means is accurately and repeatably located therein with reference to said storage means and said reading device, said transport means comprising a carriage member disposed in said shaftway, means for locating said carriage with respect to an x-axis and a y-axis transverse of said shaftway while permitting motion of said carriage along a z-axis parallel to said shaftway, a plurality of guide surfaces on the portion of said housing adjacent said shaftway, a first guide roller rotatably mounted on said carriage at a first location and bearing on a first guide surface to locate said carriage with respect to said y-axis, a second guide roller rotatably mounted on said carriage at a second location perpendicular to said first guide roller and bearing on a second guide surface to locate said carriage with respect to said x-axis, a third guide roller rotatably mounted on said carriage at a third location parallel to one of said first rollers and bearing on a third guide surface to locate said carriage with respect to rotation about said z-axis, a fourth roller rotatably mounted on said carriage at a location opposite said three guide rollers, means for biasing said fourth roller into engagement with a fourth guide surface thereby applying a predetermined loading on said three guide rollers, and drive means for moving said carriage along said z-axis.

2. An automated data library according to claim 1 wherein said drive means includes a motor, a drive cable and a counterweight, said counterweight having a weight substantially equal to the weight of said carriage, said cable being connected at one end to said carriage and at the opposite end to said counterweight, and means associated with said motor for engaging and driving said cable intermediate its ends.

3. An automated data library according to claim 1 wherein means is provided for locating said carriage with respect to rotation about said x-axis.

4. An automated data library according to claim 2 wherein means is provided for locating said carriage with respect to rotation about said x-axis and said y-axis.

5. An automated data library according to claim 3 wherein said means for locating said carriage with respect to rotation about said x-axis comprises a pair of pulleys rotatably mounted at opposite ends of one side of said carriage, and cable means extending from the top of said assembly housing to the bottom of said assembly housing, said cable being wrapped about said pair of pulleys and being tensioned so as to produce a rotating force on said carriage about said x-axis opposite to the rotating force applied by said drive means.

6. An automated data library according to claim 2 wherein means is provided for locating said carriage with respect to rotation about said x-axis.

7. An automated data library according to claim 6 wherein said means for locating said carriage with respect to rotation about said x-axis comprises a pair of pulleys rotatably mounted at opposite ends of one side of said carriage, and cable means extending from the top of said assembly housing to the bottom of said assembly housing, said cable being wrapped about said pair of pulleys and being tensioned so as to produce a rotating force on said carriage about said x-axis opposite to the rotating force applied by said drive cable.

8. An automated data library according to claim 5 including means to adjust the tension on said cable.

9. An automated data library according to claim 4 wherein said means for locating said carriage with respect to rotation about said x-axis comprises a pair of pulleys rotatably mounted at opposite ends of a first side of said carriage, cable means extending from the top of said assembly housing to the bottom of said assembly housing, said cable being wrapped about said pair of pulleys and being tensioned so as to produce a rotating force on said carriage about said x-axis opposite to the force applied by said drive cable, said means for locating said carriage with respect to rotation about said y-axis comprising a second pair of pulleys rotatably mounted at opposite ends of a second side of said carriage adjacent said first side, and second cable means extending from the top of said assembly housing to the bottom of said assembly housing, said second cable being wrapped about said second pair of pulleys and being tensioned so as to produce a rotating force on said carriage about said y-axis opposite to the rotating force applied by said drive cable.

10. An automated data library according to claim 1 wherein at least one of said first three rollers is mounted on an adjustable eccentric on said carriage whereby the position of said roller is readily adjustable to establish the horizontal location of said carriage in said shaftway.

11. In an automated data library comprising a plurality of storage means each arranged to accept and store a data storage member, a reading device arranged to retrieve data from a data storage member, and transport means arranged to selectively transfer data storage members between said storage means and said reading device, a housing for said assembly forming a generally centrally disposed shaftway accommodating the movement of said transport means and at least one generally open bay area opening into and extending along said shaftway, said bay area being arranged to locate said plurality of storage means and said reading device therein for access thereto by said transport means, the improvement comprising means for moving and guiding said transport means in said shaftway whereby said transport means is accurately and repeatably located therein with reference to said storage means and said reading device, said transport means comprising a carriage member disposed in said shaftway, means for locating said carriage with respect to an x-axis and a y-axis transverse of said shaftway while permitting motion of said carriage along a z-axis parallel to said shaftway, a plurality of guide surfaces on the portion of said housing adjacent said shaftway, a first guide roller rotatably mounted on said carriage at a first location and bearing on a first guide surface to locate said carriage with respect to said y-axis, a second guide roller rotatably mounted on said carriage at a second location perpendicular to said first guide roller and bearing on a second guide surface to locate said carriage with respect to said x-axis, a third guide roller rotatably mounted on said carriage at a third location parallel to one of said first rollers and bearing on a third guide surface to locate said carriage with respect to rotation about said z-axis, a fourth roller rotatably mounted on said carriage at a location opposite said three guide rollers, means for biasing said fourth roller into engagement with a fourth guide surface thereby applying a predetermined loading on said three guide rollers, and drive means for moving said carriage along said z-axis, said drive means including a motor, a drive cable and a counterweight, said counterweight having a weight substantially equal to the weight of said carriage, said cable being connected at one end to said carriage and at the opposite end to said counterweight, means associated with said motor for engaging and driving said drive cable intermediate its ends, means for locating said carriage with respect to rotation about said x-axis comprising a pair of pulleys rotatably mounted at opposite ends of a first side of said carriage, second cable means extending from the top of said assembly housing to the bottom of said assembly housing, said second cable being wrapped about said pair of pulleys and being tensioned so as to produce a rotating force on said carriage about said x-axis opposite to the rotating force applied by said drive cable, means for locating said carriage with respect to rotation about said y-axis comprising a second pair of pulleys rotatably mounted at opposite ends of a second side of said carriage adjacent said first side, and third cable means extending from the top of said assembly housing to the bottom of said assembly housing, said third cable means being wrapped about said second pair of pulleys and being tensioned so as to produce a rotating force on said carriage about said y-axis opposite to the rotating force applied by said drive cable, at least one of said three guide rollers being adjustably mounted on said carriage whereby the position of said roller is readily adjustable to establish the horizontal location of said carriage in said shaftway, and means for adjusting the length of said second and third cables.

* * * * *